(12) United States Patent
Ishikawa

(10) Patent No.: US 7,372,444 B2
(45) Date of Patent: May 13, 2008

(54) SEMICONDUCTOR INTEGRATED CIRCUIT

(75) Inventor: Atsushi Ishikawa, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 621 days.

(21) Appl. No.: 10/834,161

(22) Filed: Apr. 29, 2004

(65) Prior Publication Data
US 2004/0246222 A1 Dec. 9, 2004

(30) Foreign Application Priority Data
May 26, 2003 (JP) ............................. 2003-147132

(51) Int. Cl.
G09G 3/36 (2006.01)
(52) U.S. Cl. ..................... 345/100; 345/87; 345/89; 345/98; 345/99; 345/204; 345/690
(58) Field of Classification Search .............. 345/55, 345/87, 89, 98, 99, 100, 204, 690
See application file for complete search history.

(56) References Cited

U.S. PATENT DOCUMENTS

| 6,222,518 | B1* | 4/2001 | Ikeda et al. | 345/98 |
| 6,750,835 | B2* | 6/2004 | Azami | 345/89 |
| 6,909,418 | B2* | 6/2005 | Arai | 345/100 |
| 6,919,875 | B2* | 7/2005 | Abe et al. | 345/100 |
| 7,173,596 | B2* | 2/2007 | Toriumi et al. | 345/98 |
| 7,199,779 | B2* | 4/2007 | Toriumi et al. | 345/100 |
| 2004/0164945 | A1* | 8/2004 | Toriumi et al. | 349/99 |
| 2004/0212631 | A1* | 10/2004 | Toriumi et al. | 345/690 |
| 2005/0001858 | A1* | 1/2005 | Morita et al. | 345/690 |

FOREIGN PATENT DOCUMENTS

| EP | 0 821 338 A2 | 1/1998 |
| JP | A 2-208689 | 8/1990 |
| JP | A 3-132789 | 6/1991 |
| JP | A 5-303362 | 11/1993 |
| JP | A 7-146666 | 6/1995 |
| JP | A 7-175451 | 7/1995 |
| JP | A 10-83168 | 3/1998 |
| JP | A 2001-109436 | 4/2001 |
| JP | A 2003-44013 | 2/2003 |

* cited by examiner

Primary Examiner—My-Chau T. Tran
(74) Attorney, Agent, or Firm—Oliff & Berridge, PLC

(57) ABSTRACT

The invention provides a semiconductor integrated circuit having a zooming function independently in a driver IC for driving a display device. The semiconductor integrated circuit can be a semiconductor integrated circuit which respectively outputs a plurality of two-dimensional images of different sizes according to a mode signal from a plurality of output terminals. It can include select signal shift circuits and the like which, in a first mode, synchronize with one of a rise-up or a fall of a clock signal and sequentially supply a select signal to each of select signal supply terminals, and, in a second mode, synchronize with the rise-up and the fall of the clock signal and sequentially supply the select signals to two of select signal supply terminals at a time. The invention can also include a first group of latch circuits and the like which hold image data in response to the select signals sequentially supplied to the select signal supply terminals, and a second group of latch circuits and the like which hold image data outputted from the first group of latch circuits in response to a line pulse.

1 Claim, 6 Drawing Sheets

SEMICONDUCTOR INTEGRATED CIRCUIT

BACKGROUND OF THE INVENTION

1. Field of Invention

This invention relates to a semiconductor integrated circuit (a driver IC) for driving a display device, such as an LCD (liquid crystal display).

2. Description of Related Art

A display device, such as an LCD is widely used in a display part of a small apparatus, such as a digital camera and a mobile phone. Also, a camera is built in a mobile phone, giving rise to a recent demand for displaying an enlarged view of an image taken. Conventionally, image data showing image information of one pixel are used to display a plurality of pixels, whereby a zooming function is realized in a display device by increasing an area displaying identical information. However, since identical image data are employed for displaying the plurality of pixels, it is necessary to process image data in an MPU and the like.

For related techniques, in Japanese Published Patent Publication No. Hei-7-146666 (First, 12 pages, FIG. 1), there is described a scan electrode driving circuit for showing an enlarged display without setting up a peripheral device such as a memory or an A/D, D/A converter in an image display device. According to Japanese Published Patent Publication No. Hei-7-146666, it is possible to show an enlarged display even in a device having no enlarging function on its signal source side by setting up a means of driving a plurality of scan electrodes in one horizontal period. Also, since the plurality of scan electrodes are driven when displaying one piece of image data, it is not necessary to convert an analog signal to a digital signal, and there are no need to set up a memory for storing image data once, which are to be shown in an enlarged display, and a circuit controlling the memory. Further, it is made unnecessary to set up a circuit and the like for mutual conversion between analog signals and digital signals, thus contributing to miniaturization, lightweight, and low cost. Nonetheless, because no mention is made of a method of showing an enlarged display in a horizontal direction, this alone does not make it possible to realize the zooming function.

Moreover, conventional techniques require preparation of a driver IC fit for a resolution of respective LCDs per size (number of electrodes) of an image displaying LCD, so that there is a problem which makes it impossible to use the driver IC of identical specification for driving an LCD of a different resolution.

SUMMARY OF THE INVENTION

The invention can provide a semiconductor integrated circuit (a driver circuit) for driving a display device which can independently realize a zooming function. The invention can further provide a driver IC which can be used for a display device having a different resolution.

A semiconductor circuit according to the invention can be a semiconductor integrated circuit respectively outputs a plurality of display signals showing two-dimensional images of different sizes from a plurality of output terminals in accordance with a mode signal and includes a select signal shift circuit with a plurality of select signal supply terminals. The invention can include the select signal shift circuit synchronizing with one of a rise-up or a fall of a clock signal and sequentially supplying a select signal to each of the plurality of select signal supply terminals in a first mode, and synchronizing with the rise-up and the fall of the clock signal and sequentially supplying the select signal to two of the plurality of select signal supply terminals at a time in a second mode, a first group of latch circuits holding image data sequentially supplied to a data bus in response to the select signal being sequentially supplied to the plurality of select signal supply terminals; a second group of latch circuits holding respectively the image data outputted from the first group of latch circuits in response to a line pulse, a display signal generating circuit respectively generating a plurality of display signals based on the image data being held by the second group of latch circuits, and a timing control circuit supplying the line pulse of a first cycle to the second group of latch circuits in the first mode and supplying the line pulse of a second cycle, which is double the first cycle, to the second group of latch circuits in the second mode.

At this point, the select signal shift circuit may be adapted such that there are included a group of flip-flops, in which there are alternately connected a plurality of sets of first flip-flops synchronizing with one of the rise-up or the fall of the clock signal and sequentially shifting the select signal and second flip-flops synchronizing with the one of the rise-up or the fall of the clock signal and sequentially shifting the select signal in a first mode and synchronizing with the other of the rise-up or the fall of the clock signal and sequentially shifting the select signal in a second mode, and a group of selectors which makes a switchover between supplying select signals outputted from respective flip-flops to respective select signal supply terminals and supplying select signals outputted from every other flip-flop to two of adjacent select signal supply terminals according to a mode signal. Also, the group of flip-flops may be adapted so that a plurality of two-way flip-flops may be included.

According to this invention, a supply method of select signals and a cycle of the line pulse are made alterable depending upon a display mode, whereby a zooming function in a driver IC may be independently realized. Further, it is possible to provide the driver IC which may be used for a display device of a different resolution.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
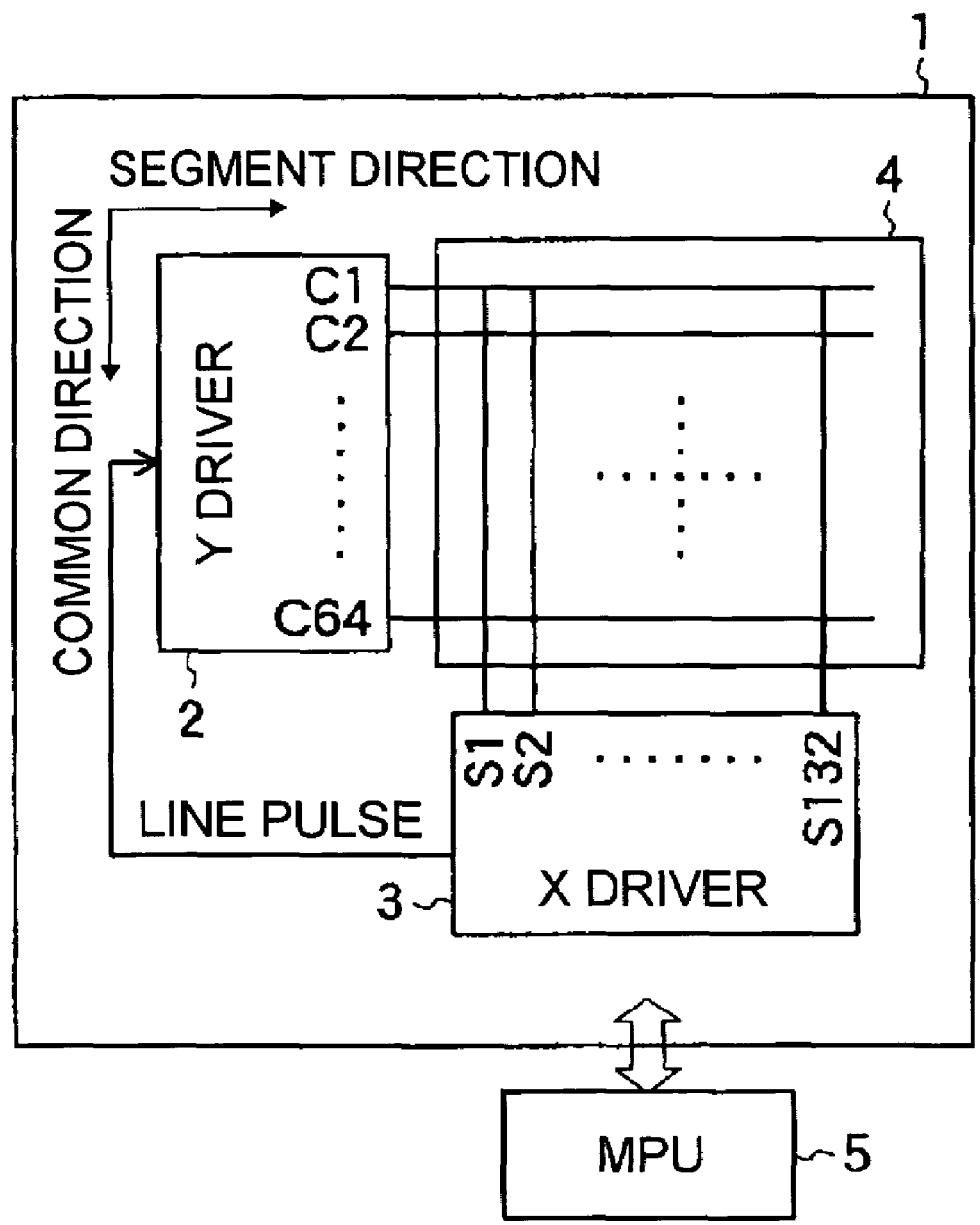
FIG. 1 is a diagram showing an image display device using a semiconductor integrated circuit according to an embodiment of this invention.

Preferred embodiments of this invention will be described below with reference to drawings, wherein like reference numerals designate identical or corresponding parts throughout to omit explanation.

Referring to FIG. 1, there is shown a construction of an image display device using a semiconductor integrated circuit according to an embodiment of this invention. An LCD will be described as an example in this embodiment. It is to be noted that a substrate in this application refers to that which can include an LCD and a driver IC to make it possible to carry out wiring electrically, such as a transparent insulating substrate, a printed circuit board, and a flexible printed circuit board. In this embodiment, a glass substrate will be used.

As shown in FIG. 1, this image display device includes a substrate 1, driver ICs 2 and 3 packed thereon, and an LCD 4. The driver IC (Y driver) 2 synchronizes with a line pulse and outputs a scan signal for driving the LCD 4. On the other hand, the driver IC (X driver) 3 outputs a display signal for driving the LCD 4 while supplying the line pulse to the Y driver 2. At this point, an MPU 5 is connected to the X driver 3, and image data and various control signals outputted from the MPU 5 are inputted thereto.

The LCD 4 has a plurality of areas in a segment direction and also a plurality of areas in a common direction. At this point, one pixel (dot) is specified by specifying one area in the segment direction and one area in the common direction. In a case of a color display device, three dots of RGB (Red, Green, and Blue) are used to show image information on one point. Take, for example, the LCD 4 having 132 (44 per each of RGB) areas in the segment direction and 64 areas in the common direction. In this case, the LCD 4 has 132×64 pixels.

Since voltage is impressed upon these areas, in the LCD 4, there are lined up a plurality of signal electrodes in the segment direction and a plurality of scan electrodes in the common direction. These signal electrodes are respectively connected to a plurality of output terminals set up on the X driver 3, while these scan electrodes are respectively connected to a plurality of output terminals set up on the Y driver 2.

The X driver 3, based on the image data inputted from the MPU 5, generates display signals S1-S132 for supplying to the plurality of signal electrodes lined up in the segment direction of the LCD 4. At this point, a display signal S (3$i$+1) is a display signal based on red image data (R data), a display signal S (3$i$+2) is a display signal based on green image data (G data), and a display signal S (3$i$+3) is a display signal based on blue image data (B data), where i=0, 1, 2, . . . , 43.

Also, the Y driver 2, according to a line pulse LPY inputted from the X driver 3, generates scan signals C1-C64 for scanning the LCD 4, respectively supplying to the plurality of scan electrodes lined up in the common direction of the LCD 4. At this point, as shown in FIG. 1, it is wired such that the scan signals C1-C64 are inputted to the LCD 4 from a left side of the figure. Further, it is wired such that the display signals S1-S132 are inputted to the LCD 4 from a lower side of the figure. It is to be noted that a transparent material is used for these wiring.

Figure 2:
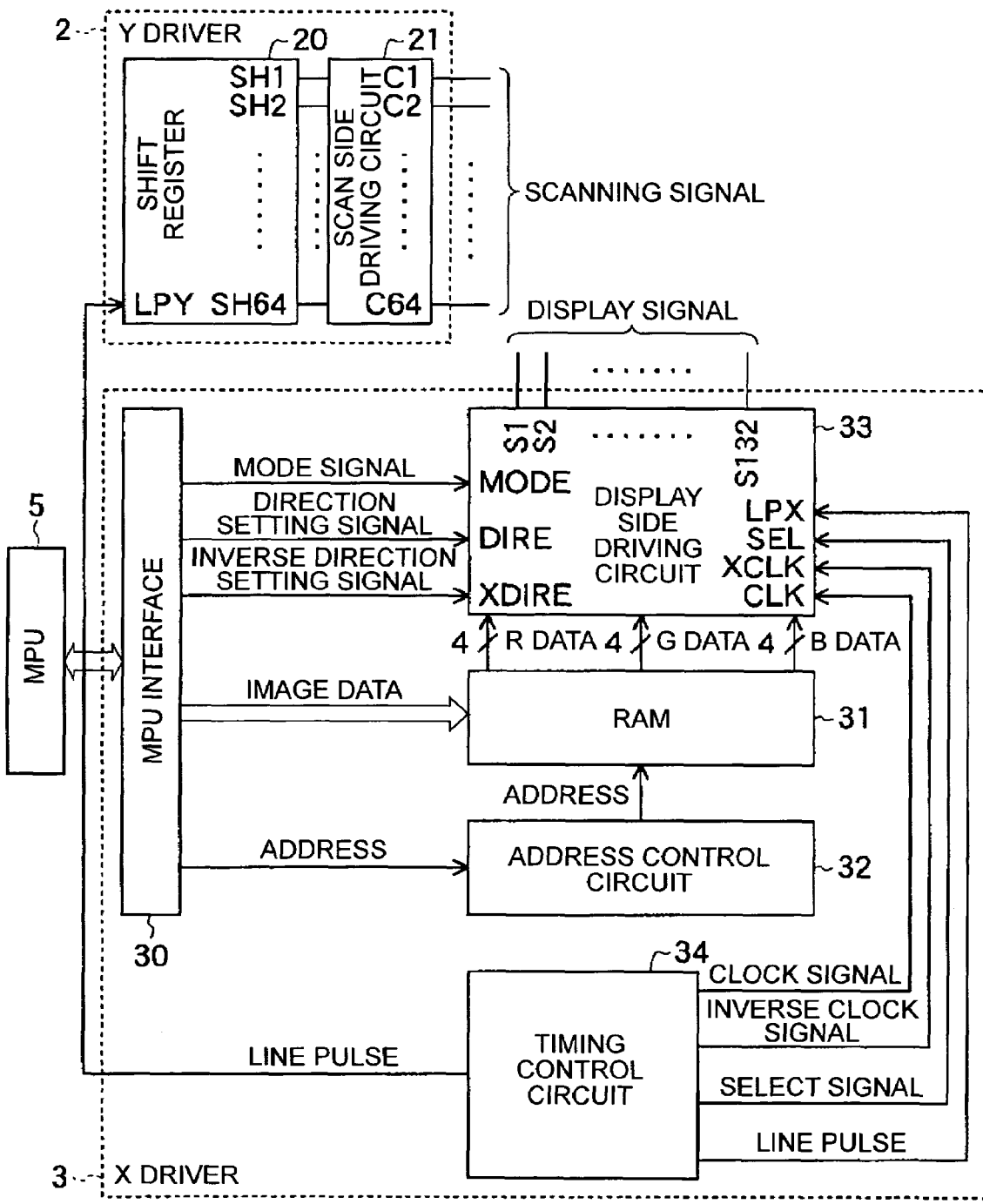
FIG. 2 is a diagram showing a construction of a semiconductor integrated circuit according to an embodiment of this invention.

Referring to FIG. 2, there is shown an exemplary construction of a semiconductor integrated circuit according to an embodiment of this invention. As shown in FIG. 2, the X driver 3 includes an MPU interface 30 for connecting to the MPU 5, a RAM 31 for storing the image data inputted from the MPU 5, an address control circuit 32 for specifying a storage area (address) of image data in the RAM 31 and controlling write and read of the image data, a display side drive circuit 33 for generating the display signals S1-S132, based on the image data read from the RAM 31, and a timing control circuit 34 for controlling output timing of the display signal and the scan signal.

The MPU interface 30 outputs a mode signal MODE indicating a normal display or an enlarged display inputted from the MPU 5, a direction setting signal DIRE and an inverse direction setting signal XDIRE to the display side drive circuit 33.

The storage area of the image data in the RAM 31 is specified by the address control circuit 32 based on an address inputted from the MPU 5. Also, the RAM 31 supplies image data read from the RAM 31 to the display side drive circuit 33, respectively as the R data, the G data, and the B data of parallel 4 bits.

The display side drive circuit 33 generates the display signals S1-S132 based on the R data, the G data, the B data, the mode signal MODE, the direction setting signal DIRE inputted from the MPU 5 through the MPU interface, a clock signal CLK and an inverse clock signal XCLK, a select signal SEL, and the line pulse LPX inputted from the timing control circuit 34, thereby respectively outputting to the plurality of signal electrodes of the LCD 4 shown in FIG. 1

The direction setting signal is a signal based on a packing positional relationship between the X driver 3 and the LCD 4. As shown in FIG. 1, in a case where a direction of inputting the display signals S1-S132 from the lower side of the figure to the LCD 4 is taken as a forward direction, and if the driver X is packed from the upper side of the LCD 4, left and right of an image to be shown is reversed, so that instead of the display signals S1-S132 to be outputted in the forward direction, it is necessary to output the display signals S1-S132 from the left side of the figure. Consequently, the direction setting signal, a shift direction of the select signal can be set.

Again, referring to FIG. 2, the timing control circuit 34 controls an output timing of the display signal in the display side drive circuit 33, while, at the same time, supplying the line pulse LPY governing line scanning to the Y driver 2, so as to control the output timing of the scan signal in the Y driver 2. Now, the timing control circuit 34 supplies the line pulse LPX having a normal cycle in the normal display mode to the display side drive circuit 33, and, in the enlarged display mode, supplies the line pulse LPX having a cycle double the normal cycle to the display side drive circuit 33. As a result, in the enlarged display mode, an image of 2 line portions is shown by using the image data of 1 line portion.

The Y driver 2 includes a shift register 20 and a scan side drive circuit 21. The shift register 20 synchronizes with the line pulse LPY and sequentially outputs shift signals SH1-SH64. The scan side drive circuit 21, based on the shift signals SH1-SH64 outputted from the shift register 20, sequentially generates and output signals C1-C64 to the scan electrodes.

Figure 3:
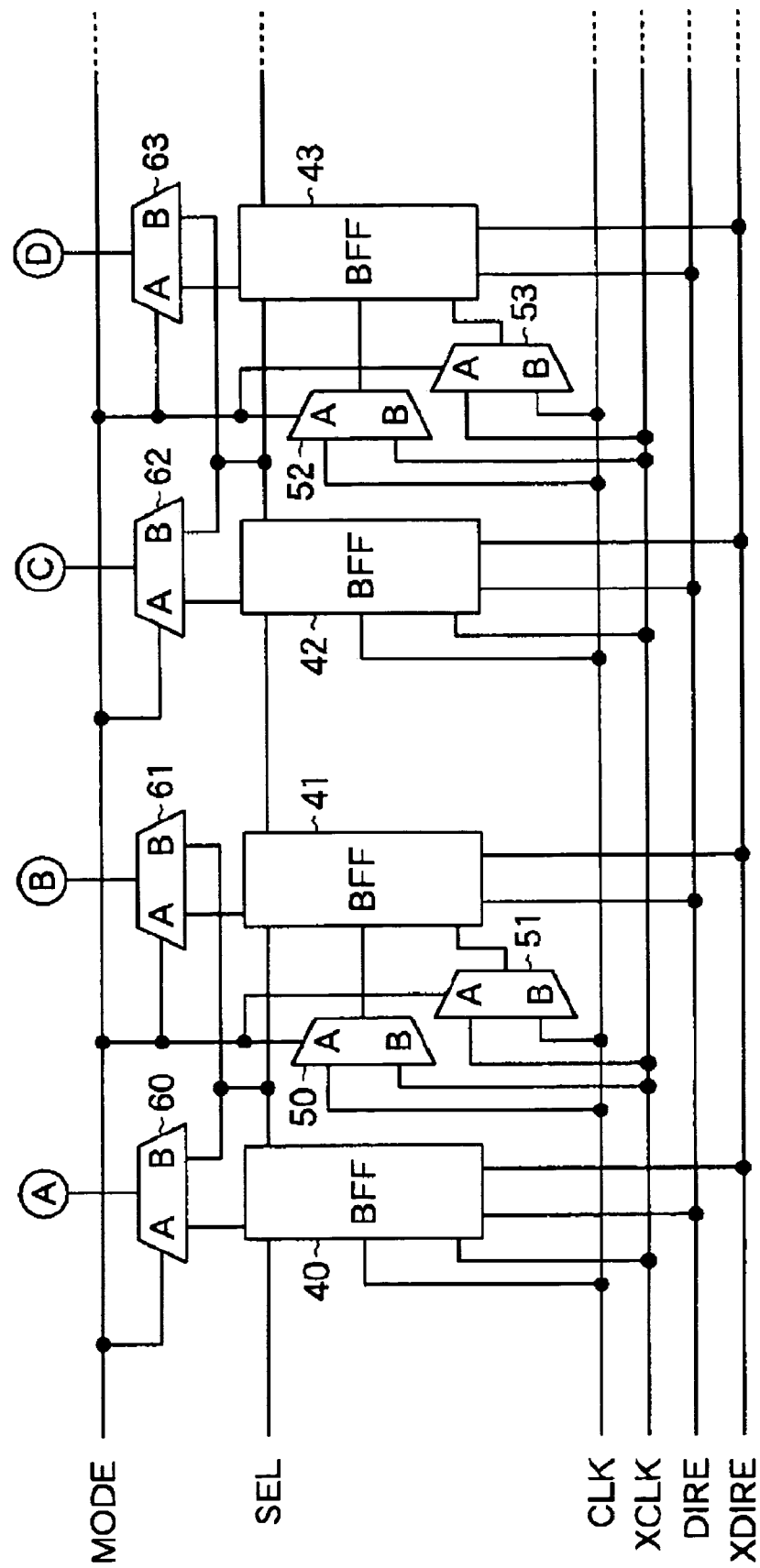
FIG. 3 is a diagram showing a detailed construction (lower side) of a display side driving circuit illustrated in FIG. 2.
Figure 4:
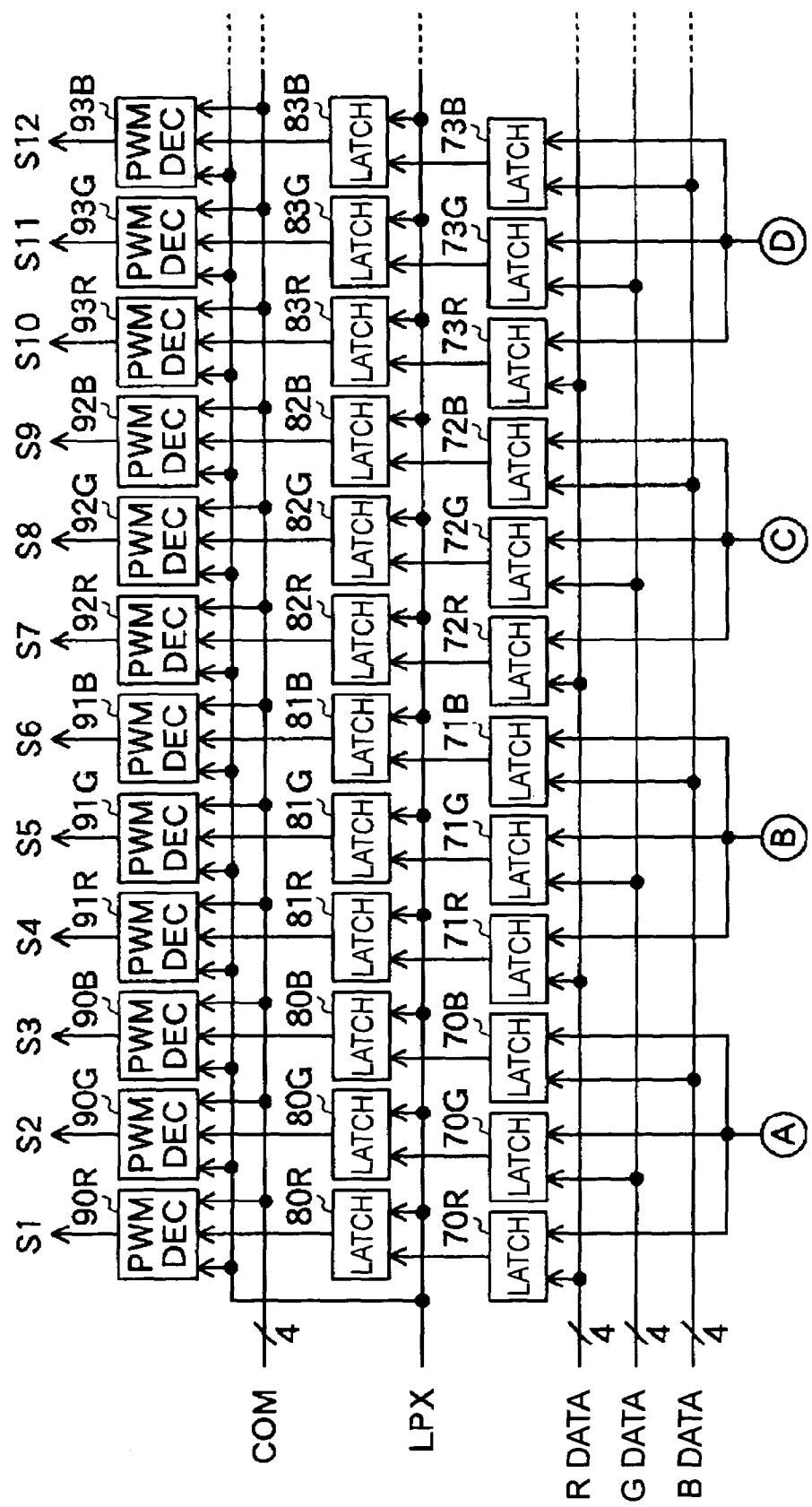
FIG. 4 is a diagram showing a detailed construction (upper side) of a display side driving circuit illustrated in FIG. 2.

Referring to FIG. 3 and FIG. 4, there is shown a detailed construction of the display side drive circuit shown in FIG. 2. As FIG. 3 illustrates, the display side drive circuit includes two-way flip-flops 40, 41, 42, 43, . . . which synchronize with the clock signal CLK and the inverse clock signal XCLK and sequentially hold the select signal SEL. When the direction setting signal DIRE is on high level, the two-way flip-flops 40, 41, 42, 43, . . . hold the select signal SEL being inputted from the left side of the figure and output it to the right side and upper side thereof, while holding the select signal SEL being inputted from the right side thereof and outputting it to the left side and upper side thereof, when the direction setting signal DIRE is on low level.

Also, the display side drive circuit includes selectors 50, 51, 52, 53, ... which switch over a connection of clock signal wiring being inputted to two-way flip-flops 41, 43, ... of even-number items according to the mode signal MODE. In a normal display mode, the selectors 50, 511, 52. 53, ... select and output a signal being inputted to a terminal A, and in an enlarged display mode, select and output a signal being inputted to a terminal B.

Accordingly, in the normal display mode, all two-way flip-flops 40, 41, 42, 43, ... operate synchronously with a leading edge of the clock signal CLK. Further, in the enlarged display mode, two-way flip-flops 40, 42, ... of odd-number items operate synchronously with a leading edge of the clock signal CLK, and two-way flip-flops 41, 43, ... of the even-number items operate synchronously with a trailing edge of the clock signal CL. As a result, in the enlarged display mode, the select signal is shifted twice in one cycle of the clock signal.

Furthermore, the display side drive circuit 33 can include selectors 60, 61, ... which select and output either the select signal inputted to the terminal A or the select signal inputted to the terminal B according to the mode signal MODE. Consequently, in the normal display mode, synchronizing with either a rise-up or a fall of the clock signal CLK, the select signal is sequentially supplied to each of select signal supply terminals A, B, C, D, ... On the other hand, in the enlarged display mode, synchronizing with the rise-up and the fall of the clock signal CLK, the select signal is sequentially supplied to two of the select signal supply terminals A, B, C, D, ...

As shown in FIG. 4, the display side drive circuit can include a first group of latch circuits 70R, 71R, ... and 70G, 71G, ... and 70B, 71B, ... which synchronizes with the select signal SEL and holds image data sequentially supplied to a data bus; a second group of latch circuits 80R, 81R, ... and 80G, 81G, ... and 80B, 81B, ... which synchronize with the line pulse LPX and hold respectively image data outputted from the first group of latch circuits; and pulse width modulating decoders 90R, 91R, ... and 90G, 91G, ... and 90B, 91B, ... which respectively generate display signals based on image data outputted from the second group of latch circuits. Since each of these pulse width modulating decoders generates the display signal based on the R data, the G data, and the B data of parallel 4 bits, it is possible to display tones of 4,096 colors through combinations of three colors of RGB. The pulse width modulating decoders 90R, 90G, 90B and the like modulate the pulse width of the display signal according to a timing in which respective image data of RGB match comparative data COM based on count values.

Since these pulse width modulating decoders repectively generate display signals based on the R data, the G data, and the B data of parallel 4 bits, the tones of 4,096 colors through combinations of three colors of RGB may be displayed. The pulse width modulating decoders 90R, 90G, 90B and the like modulate the pulse widths of display signals according to a timing in which respective image data of RGB match the comparative data COM based on the count values.

Next, operation of the display side drive circuit shown in FIG. 3 and FIG. 4 will be described. It is to be noted that to simplify description of the following, only the R data will be described.

Figure 5:
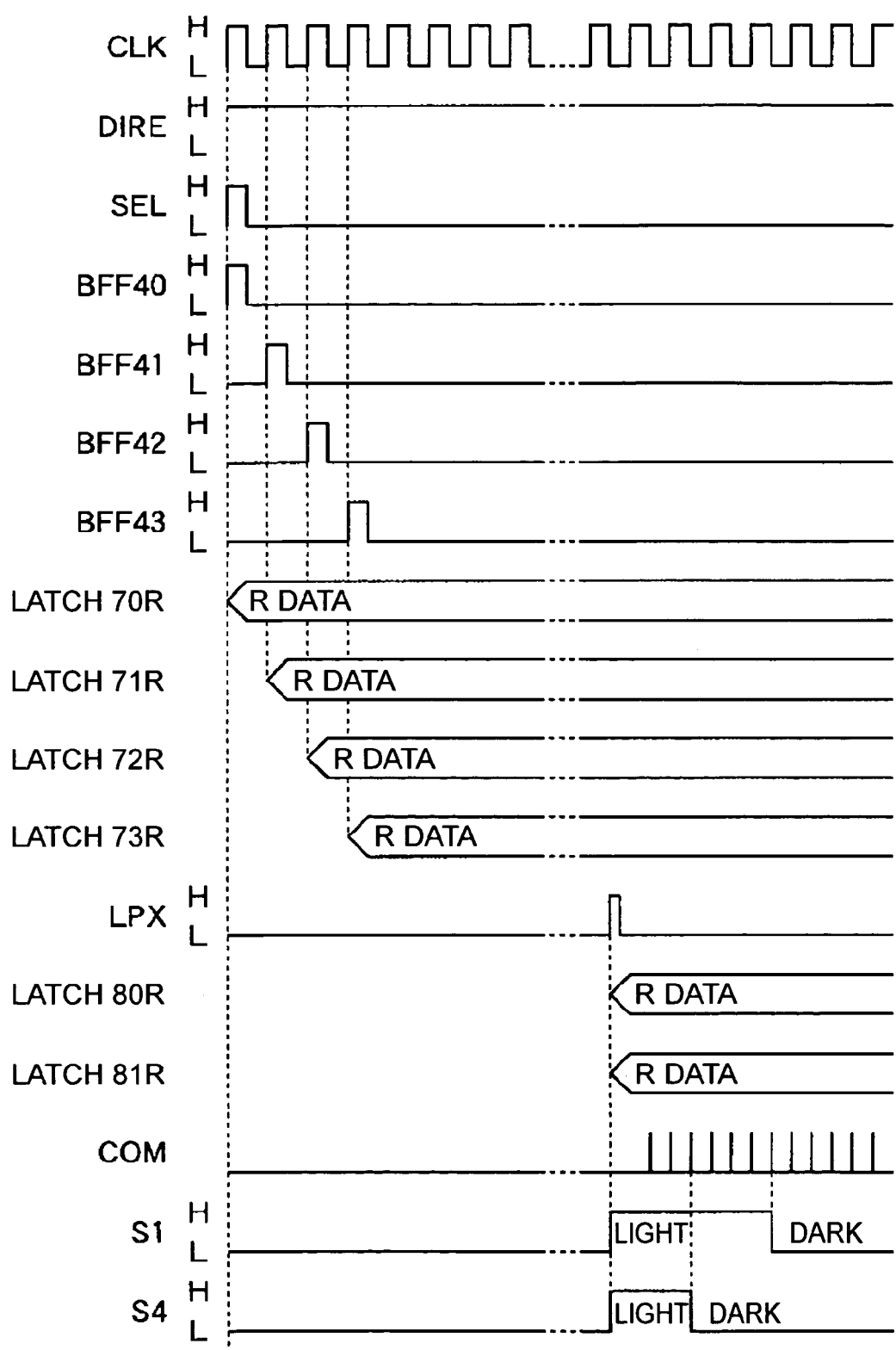
FIG. 5 is a diagram explaining operation of the display side driving circuit in a normal display mode.

FIG. 5 is a diagram to explain operation of the display side drive circuit in the normal display mode. When the direction setting signal DIRE is on high level, the two-way flip-flops 40, 41, 42, 43, ... synchronize with the rise-up of the clock signal CLK and sequentially output the select signal first from the two-way flip-flops on the left side of FIG. 3.

In the normal display mode, the selector 60 selects and outputs a signal inputted to the terminal A, so that in the first group of latch circuits, the latch circuit 70R synchronizes with a select signal SEL outputted from the two-way flip-flop (BFF) 40 and holds image data. Likewise, the latch circuits 71R, 72R, 73R, ... synchronize with a select signal SEL outputted from the two-way flip-flops (BFF) 41, 42, 43, ... and hold image data.

The second group of latch circuits 80R, 81R, ... synchronizes with the line pulse LPX and respectively holds image data outputted from the first group of latch circuits 70R, 701R, ... Each of the pulse width modulating decoders 90R, 91R, ... synchronizes with the line pulse LPX, outputs high-level display signals S1, S4, ... and brightly displays a corresponding pixel, whereas, when a correspondence between respective image data and the comparative data COM is detected, the corresponding pixel is displayed dark with the display signals S1, S4, ... as low level. Depending on a pulse width of each display signal, lightness of its pixel is determined.

Figure 6:
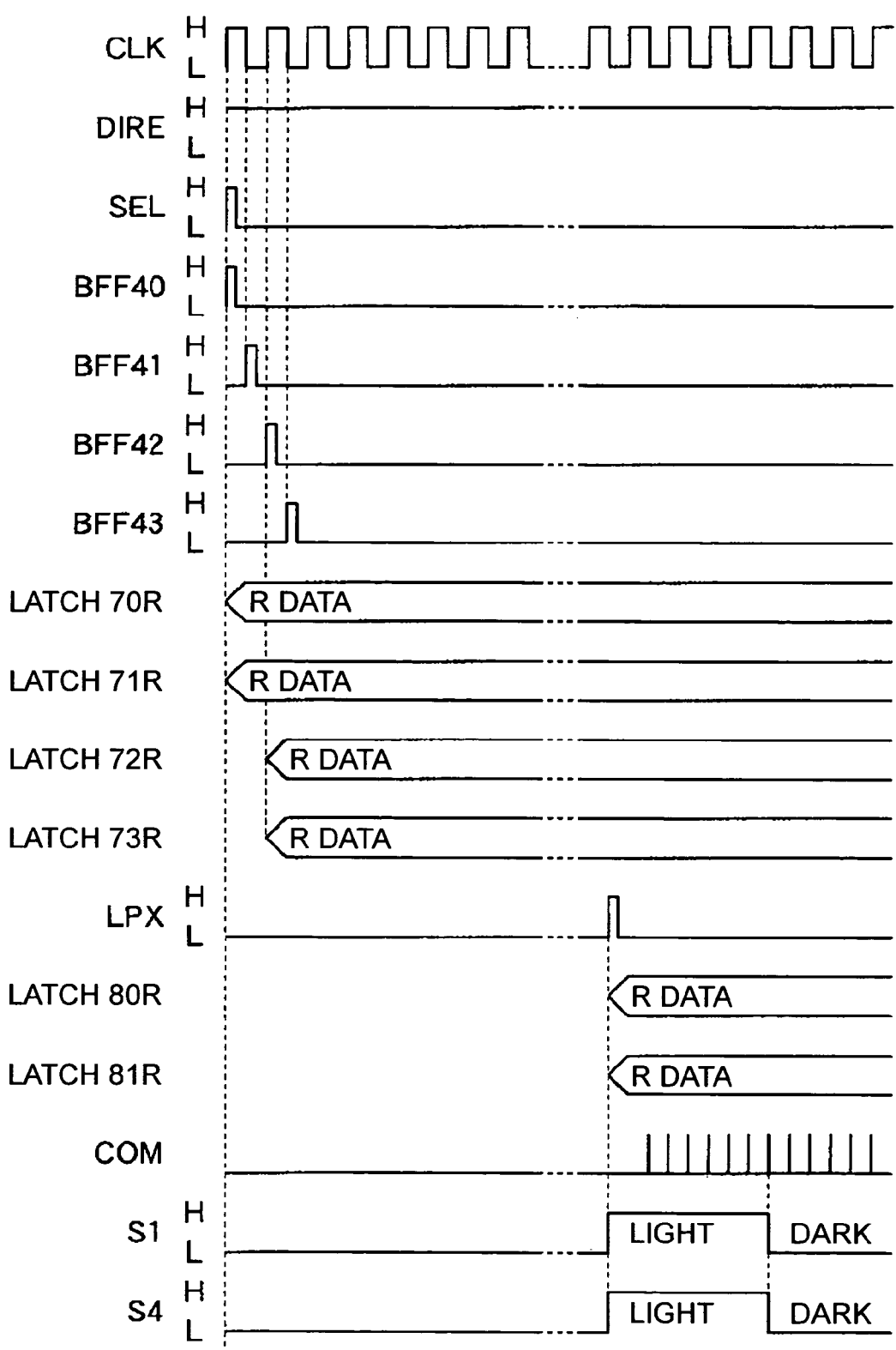
FIG. 6 is a diagram explaining operation of the display side driving circuit in an enlarged display mode.

FIG. 6 is a diagram to explain operation of the display side drive circuit in the enlarged display mode. When the direction setting signal DIRE is on high level, the two-way flip-flops 40, 42, ... of the odd-number items synchronize with the rise-up of the clock signal CLK, and the two-way flip-flops 41, 43, ... of the even-number items synchronize with the fall of the clock signal CL, whereby the select signal SEL is sequentially outputted from the two-way flip-flops on the left side of FIG. 3 first.

In the enlarged display mode, the selector 60 selects and outputs a signal to be inputted to the terminal B, so that in the first group of latch circuits, the latch circuits 70R and 71R synchronize with the select signal SEL, which is outputted from the two-way flip-flop (BFF) 40, and hold image data. Likewise, the latch circuits 72R and 73R synchronize with a select signal SEL outputted from the two-way flip-flop (BFF) 40 and hold image data. By doing so, as regards two of adjacent select signal supply terminals in the horizontal direction at a time, an image is displayed using the identical image data.

Also, the timing control circuit 34 supplies the line pulse having a cycle double a normal cycle to the second group of latch circuits 80R and the like. Since this enables a display of two lines to be shown by using image data of one line, an image is doubled both longitudinally and horizontally, thus realizing a 2 by 2 zooming function. Other operations can be the same as described with reference to FIG. 5.

By such a construction, in the enlarged mode, the image data outputted from the MPU may be displayed, without processing, in an image enlarged longitudinally and horizontally by controlling only the driver IC. Also, in a case of driving a small LCD half in size (number of electrodes), it is possible for the small LCD to show a normal display by connecting the output terminals of the X driver to every other signal electrode of the LCD and operating the X driver in the enlarged display mode.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A semiconductor integrated circuit that outputs a plurality of display signals showing two-dimensional images of different sizes from a plurality of output terminals in accordance with a mode signal, comprising:
- a select signal shift circuit with a plurality of select signal supply terminals, the select signal shift circuit synchronizing with one of a rise-up or a fall of a clock signal and sequentially supplying a select signal to each of the plurality of select signal supply terminals in a first mode, and synchronizing with the rise-up and the fall of the clock signal and sequentially supplying the select signal to two of the plurality of select signal supply terminals in a second mode;
- a first group of latch circuits that hold image data sequentially supplied to a data bus in response to the select signal being sequentially supplied to the plurality of select signal supply terminals;
- a second group of latch circuits that hold image data outputted from the first group of latch circuits in response to a line pulse;
- a display signal generating circuits that generate a plurality of display signals based on the image data being held by a second group of latch circuits; and
- a timing control circuit that supplies the line pulse of a first cycle to the second group of latch circuits in the first mode and the line pulse of a second cycle which is double the first cycle to the second group of latch circuits in the second mode, the select signal shift circuit including:

a group of flip-flops in which there are alternately connected a plurality of sets of first flip-flops synchronizing with one of the rise-up or the fall of the clock signal and sequentially shifting the select signal and second flip-flops synchronizing with the one of the rise-up or the fall of the clock signal and sequentially shifting the select signal in the first mode and synchronizing with the other of the rise-up or the fall of the clock signal and sequentially shifting the select signal in the second mode, wherein the group of flip-flops including a plurality of two-way flip-flops; and a group of selectors that make a switchover between supplying select signals outputted from respective flip-flops to respective select signal supply terminals and supply select signals outputted from every other flip-flop to two of adjacent select signal supply terminals according to a mode signal.

* * * * *